US010639625B2

(12) United States Patent
Kuniyasu et al.

(10) Patent No.: US 10,639,625 B2
(45) Date of Patent: May 5, 2020

(54) PIPETTE TIP AND LIQUID INJECTION METHOD

(71) Applicant: FUJIFILM Corporation, Tokyo (JP)

(72) Inventors: Toshiaki Kuniyasu, Ashigarakami-gun (JP); Toshihito Kimura, Ashigarakami-gun (JP); Tomonori Nishio, Ashigarakami-gun (JP); Kazuteru Nishijima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 15/933,690

(22) Filed: Mar. 23, 2018

(65) Prior Publication Data

US 2018/0207633 A1 Jul. 26, 2018

Related U.S. Application Data

(63) Continuation of application No. PCT/JP2016/075586, filed on Sep. 1, 2016.

(30) Foreign Application Priority Data

Sep. 28, 2015 (JP) .................................. 2015-189733

(51) Int. Cl.
*B01L 3/02* (2006.01)
*G01N 35/10* (2006.01)
(Continued)

(52) U.S. Cl.
CPC ............... *B01L 3/0275* (2013.01); *B01L 3/02* (2013.01); *B01L 3/0217* (2013.01); *B04B 5/02* (2013.01);
(Continued)

(58) Field of Classification Search
CPC ........ B01L 3/0275; B01L 3/0217; B01L 3/02; B01L 2200/141; B01L 2200/0615;
(Continued)

(56) References Cited

U.S. PATENT DOCUMENTS 4,214,874 A * 7/1980 White ................. B01F 11/0082
220/DIG. 19
5,260,030 A * 11/1993 DeVaughn .............. B01L 3/022
422/525
(Continued)

FOREIGN PATENT DOCUMENTS

JP   3-180764 A   8/1991
JP   2002-1136 A  1/2002
(Continued)

OTHER PUBLICATIONS

Japanese Office Action, dated Sep. 5, 2018, for corresponding Japanese Application No. 2015-189733, with an English translation.
(Continued)

*Primary Examiner* — Jill A Warden
*Assistant Examiner* — Brittany I Fisher
(74) *Attorney, Agent, or Firm* — Birch, Stewart, Kolasch & Birch, LLP

(57) ABSTRACT

A pipette tip includes a body and projections. In the body, a flow passage in which liquid from the syringe flows and an ejection opening that ejects the liquid, which has flowed through the flow passage, to the outside are formed. The ejection opening is formed in a distal end portion. The projections are provided on the distal end portion and protrude from a region around the ejection opening in the ejection direction of liquid. The projections are partially disposed around the central axis of the body. Even in a case where a residual droplet adheres to the ejection opening, the residual droplet does not adhere to an injection opening of
(Continued)

a sample container, because the projections guard a region around the residual droplet.

19 Claims, 15 Drawing Sheets

(51) Int. Cl.
*B04B 11/00* (2006.01)
*B04B 5/02* (2006.01)

(52) U.S. Cl.
CPC ............. *B04B 11/00* (2013.01); *G01N 35/10* (2013.01); *B01L 2200/025* (2013.01); *B01L 2200/0615* (2013.01); *B01L 2200/141* (2013.01); *G01N 2035/103* (2013.01)

(58) Field of Classification Search
CPC ............. B01L 2200/015; G01N 35/10; G01N 2035/103; B04B 11/00; B04B 5/02
USPC .................................................. 422/525, 545
See application file for complete search history.

(56) References Cited

U.S. PATENT DOCUMENTS

| | | | | |
|---|---|---|---|---|
| 8,263,390 | B2 * | 9/2012 | Tajima | B01L 3/0275 422/405 |
| 2003/0165408 | A1 * | 9/2003 | Takeda | B01L 3/0275 422/525 |
| 2006/0083662 | A1 * | 4/2006 | Myakishev | B01L 3/0275 422/400 |
| 2006/0171851 | A1 * | 8/2006 | Motadel | B01L 3/0241 422/400 |
| 2006/0172433 | A1 * | 8/2006 | Motadel | B01L 3/0241 436/180 |
| 2008/0095665 | A1 | 4/2008 | Smith | |
| 2008/0131326 | A1 | 6/2008 | Pelletier et al. | |
| 2009/0197280 | A1 * | 8/2009 | Bangert | G01N 33/6893 435/7.1 |
| 2010/0316542 | A1 * | 12/2010 | Mototsu | B01L 3/0275 422/525 |
| 2014/0186235 | A1 * | 7/2014 | Kwak | B01L 3/021 422/520 |
| 2014/0216579 | A1 * | 8/2014 | Bemis | F17D 3/00 137/565.23 |
| 2016/0100786 | A1 | 4/2016 | Nishio et al. | |

FOREIGN PATENT DOCUMENTS

| | | |
|---|---|---|
| JP | 2009-210353 A | 9/2009 |
| JP | 2010-510488 A | 4/2010 |
| JP | 2011-214842 A | 10/2011 |
| JP | 2014-198281 A | 10/2014 |
| WO | WO 2015/002193 A1 | 1/2015 |

OTHER PUBLICATIONS

European Office Action, dated Mar. 13, 2019, for European Application No. 16851015.4.
Japanese Office Action, dated Apr. 2, 2019, for corresponding Japanese Application No. 2015-189733, with an English translation.
Extended European Search Report, dated Jun. 21, 2018, for corresponding European Application No. 16851015.4.
International Preliminary Report on Patentability and Written Opinion of the International Searching Authority (Forms PCT/IB/326, PCT/IB/373 and PCT/ISA/237) for Application No. PCT/JP2016/075586, dated Apr. 12, 2018, with English translation.
International Search Report and English translation (Form PCT/ISA/210) for Application No. PCT/JP2016/075586, dated Nov. 29, 2016.
European Office Action dated Sep. 24, 2019, for corresponding European Application No. 16851015.4.

* cited by examiner

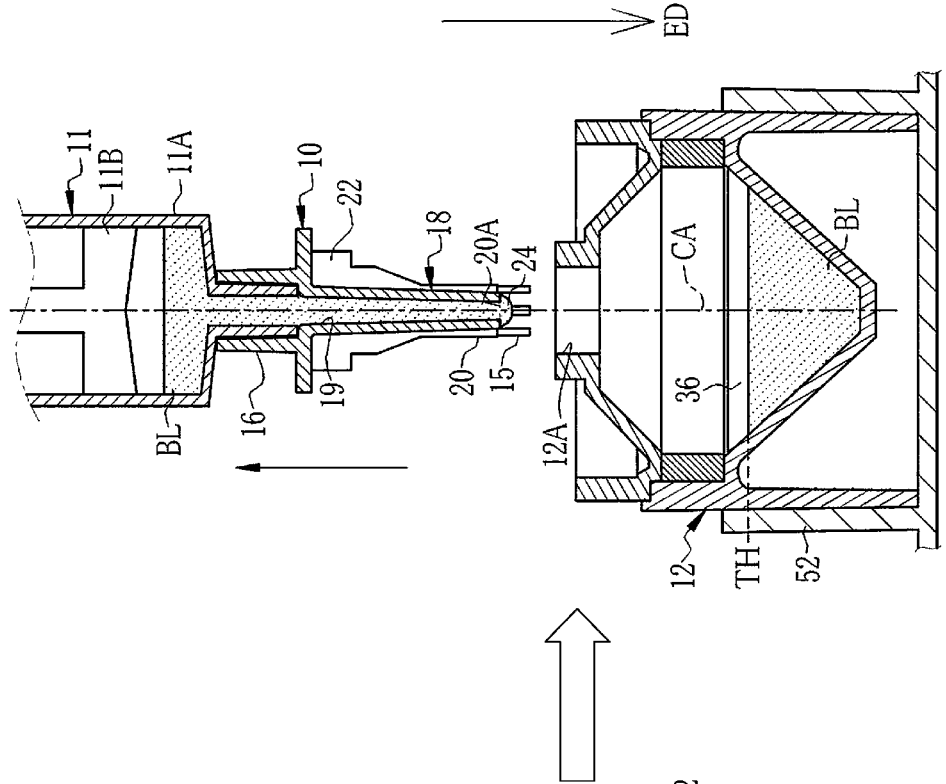
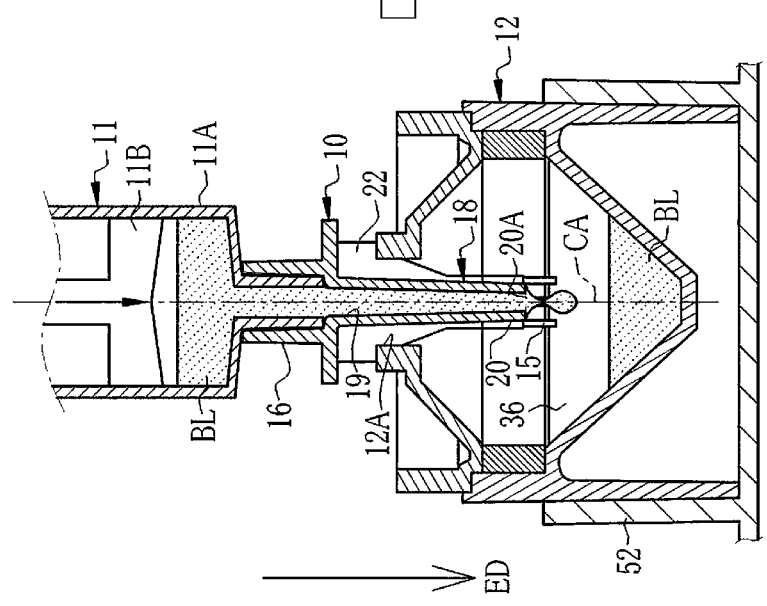
FIG. 11A
FIG. 11B

<COMPARATIVE EXAMPLE>

PIPETTE TIP AND LIQUID INJECTION METHOD

CROSS-REFERENCE TO RELATED APPLICATIONS

This application is a Continuation of PCT International Application No. PCT/JP2016/075586 filed on Sep. 1, 2016, which claims priority under 35 U.S.C § 119(a) to Japanese Patent Application No. 2015-189733 filed on Sep. 28, 2015. Each of the above application(s) is hereby expressly incorporated by reference, in its entirety, into the present application.

BACKGROUND OF THE INVENTION

1. Field of the Invention

The present invention relates to a pipette tip and a liquid injection method.

2. Description of the Related Art

Pipette tips are widely used to inject liquid from an injector, such as a pipette or a syringe, into a sample container. Pipette tips each include a tubular body, and the body has a distal end portion in which an ejection opening that ejects liquid is formed. For example, in the medical field, a pipette tip is used to inject blood, which has been sampled from a living body, into a sample container in a biochemical test for measuring chemical components (such as potassium, sodium, albumin, creatinine, and the like) in the blood. The blood is separated into a blood cell component and a blood plasma component by spinning the sample container in a centrifuge. The chemical components are measured on the basis of the blood plasma component.

JP2011-214842A describes a pipette tip (termed as a "dispenser nozzle" in JP2011-214842A) including a cover for restricting an area to which blood splashes from an ejection opening. The cover projects from a region around the ejection opening in an ejection direction in which blood is ejected and has a tubular shape that covers the entire outer periphery of a distal end portion. When injecting blood into a sample container by using the pipette tip, the cover prevents blood from splashing to positions outside the sample container into which blood is to be injected.

JP2014-198281A describes a sample container (termed as a "centrifugal separation container" in JP2014-198281A) including an injection opening from which blood is injected, a storage portion for storing injected blood, and a trap portion. After centrifugal separation, a blood cell component is trapped by the trap portion, and only a blood plasma component or a blood serum component remains in the storage portion. JP2009-210353A describes a dispensing device that dispenses a necessary amount of liquid sample with high precision particularly in a case where the amount is very small.

SUMMARY OF THE INVENTION

In a case where injecting blood into the sample container described in JP2014-198281A by using a pipette tip, first, an injector is set to the pipette tip, which has been inserted into the injection opening of the sample container beforehand, and blood is injected. After the blood has been injected, the pipette tip is withdrawn from the injection opening together with the injector.

In general, after liquid has been ejected from a thin tube, such as a pipette tip, due to surface tension acting on the ejection opening, a residual droplet, which is not dropped, protrudes from the ejection opening in the ejection direction. Therefore, in case where injecting blood into the sample container described in JP2014-198281A by using a pipette tip, a residual droplet may adhere to the injection opening when the pipette tip is withdrawn from the injection opening.

If a residual droplet adheres to the injection opening, it is considered that the following trouble may occur. Since a residual droplet includes a blood cell component even after centrifugal separation, if a residual droplet adhering to the injection opening drops into the storage portion after centrifugal separation, the blood cell component in the residual droplet may be mixed with a blood plasma component or a blood serum component in the storage portion, and the reliability of the measurements of the chemical components decrease. Possibly, a residual droplet adhering to the injection opening may splash to the inside of a centrifuge due to centrifugal separation, and the centrifuge may be contaminated. If the droplet splashed to the inside of the centrifuge is not removed, the droplet may drop into the storage portion of a sample container for another living body, and may cause errors in the measurements of chemical components of the living body. Therefore, it is desirable to provide measures for reliably preventing adhesion of a residual droplet to the injection opening.

In a case where a cover of the pipette tip as described in JP2011-214842A is provided, the cover prevents direct contact between the injection opening and the ejection opening, so that a residual droplet at the ejection opening does not directly adhere to the injection opening. However, since the cover described in JP2011-214842A has a tubular shape that covers the entire outer periphery of the distal end portion, it is highly likely that a residual droplet adheres to the cover and the adhering residual droplet is trapped by the cover. Therefore, instead of a residual droplet at the ejection opening, the residual droplet trapped by the cover may adhere to the injection opening. Accordingly, even with the pipette tip having the cover described in JP2011-214842A, it is not possible to reliably prevent a residual droplet from adhering to the injection opening. In the dispensing device described in JP2009-210353A, driving of the nozzle is controlled by a machine. Therefore, there is no possibility that a residual droplet adheres to an injection opening, and no consideration is given to prevention of adhesion of a residual droplet at an ejection opening to the injection opening of a sample container.

An object of the present invention is to provide a pipette tip and a liquid injection method that can prevent adhesion of a residual droplet at an ejection opening to an injection opening of a sample container.

In order to achieve the object, a pipette tip according to the present invention includes a tubular body having a distal end portion in which an ejection opening that ejects liquid from an injector is formed; and a projection that is provided on the distal end portion and that projects from a region around the ejection opening in an ejection direction of the liquid, the projection being partially disposed around an axis of the body.

Preferably, a plurality of the projections are provided, and the plurality of projections are disposed at intervals around the axis. In this case, preferably, the plurality of projections are disposed at regular intervals.

Preferably, the projection has a columnar shape extending in a longitudinal direction that is the ejection direction. In this case, preferably, the projection has a cylindrical columnar shape. Further, preferably, a distal end of the projection is rounded.

Preferably, an occupancy ratio of the projection to an entire circumference around the axis is in a range of 3% to 10%. Preferably, the projection has a tapered shape whose diameter decreases from a proximal end side toward a distal end thereof.

Preferably, the projection is provided in such a way that a gap is not formed between the projection and an outer peripheral surface of the distal end portion around the axis in a width direction perpendicular to an axial direction of the distal end portion.

Preferably, an anticoagulant for suppressing coagulation of the liquid is applied to a flow passage in the body through which the liquid from the injector flows toward the ejection opening.

Preferably, the distal end portion and the projection are integrally formed.

A liquid injection method according to the present invention uses a pipette tip including a tubular body having a distal end portion in which an ejection opening that ejects liquid from an injector is formed; and a projection that is provided on the distal end portion and that projects from a region around the ejection opening in an ejection direction of the liquid, the projection being partially disposed around an axis of the body. The method includes attaching the pipette tip to the injector; inserting the distal end portion of the pipette tip into an injection opening of a sample container; and injecting the liquid into the sample container from the injector.

Preferably, the pipette tip satisfies a condition DL/2≤RG, where DL is a maximum width of a residual droplet in a radial direction of the ejection opening, the residual droplet being a droplet that protrudes from the ejection opening in the ejection direction and that remains, and RG is a distance from a center of the ejection opening to the projection in the radial direction.

Preferably, the pipette tip satisfies a condition HL HG, where HL is a maximum length of a residual droplet in the ejection direction, the residual droplet being a droplet that protrudes from the ejection opening in the ejection direction and that remains, and HG is a length of the projection in the ejection direction.

Preferably, the injector is used to inject blood into a sample container for centrifugal separation, the blood having been sampled from a living body.

With the present invention, it is possible to provide a pipette tip and a liquid injection method that can prevent adhesion of a residual droplet at an ejection opening to an injection opening of a sample container, because the projection, which protrudes from a region around the ejection opening in the ejection direction of liquid and that is partially disposed around the axis of the body, is provided on the distal end portion.

BRIEF DESCRIPTION OF THE DRAWINGS

FIG. 11A illustrates a state in which blood is being injected into the sample container via the pipette tip,
and FIG. 11B illustrates a state in which the pipette tip is being withdrawn from the sample container.

DESCRIPTION OF THE PREFERRED EMBODIMENTS

Figure 1:
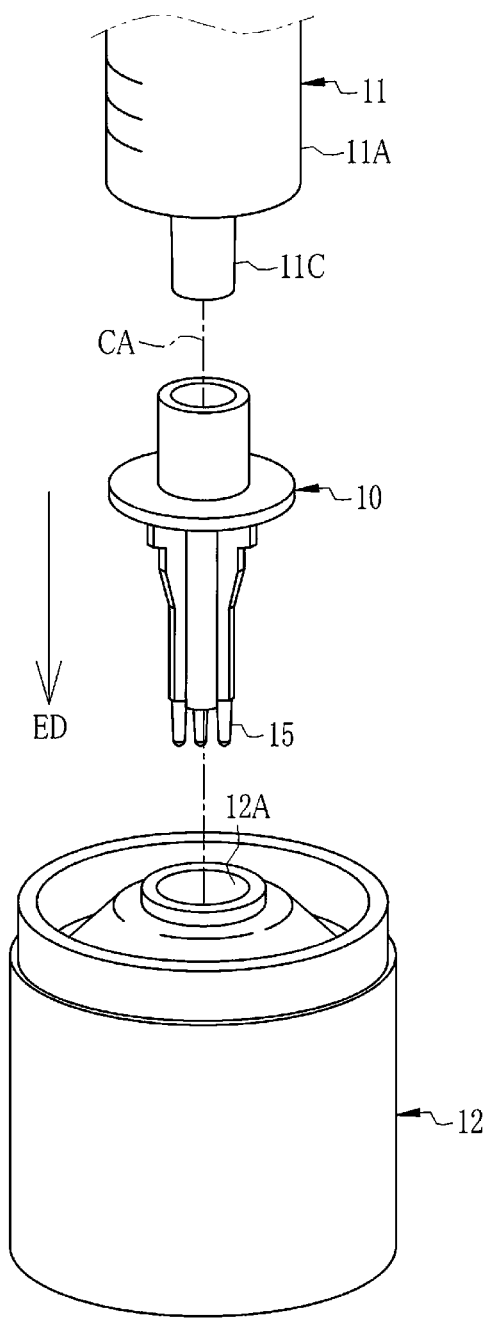
FIG. 1 is an exploded perspective view of a syringe, a pipette tip, and a sample container.
Figure 2:
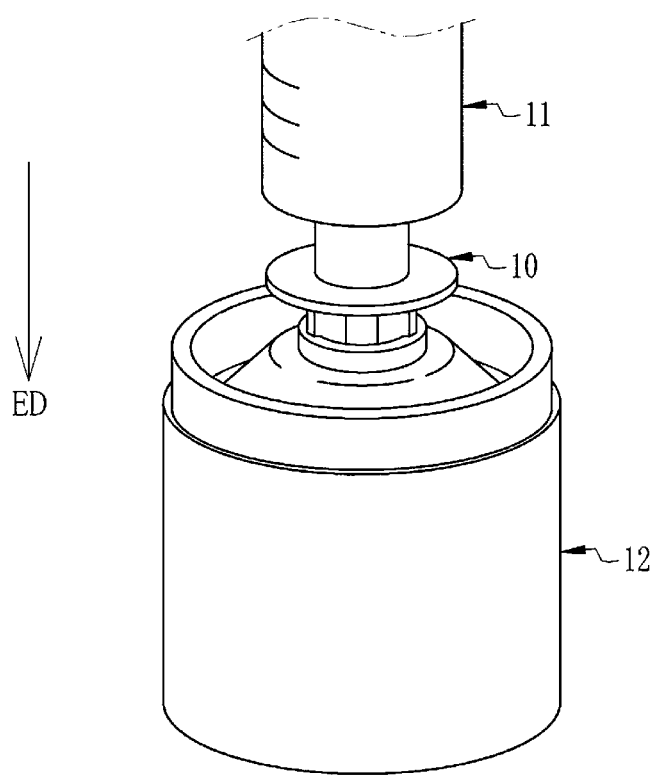
FIG. 2 is a perspective view illustrating a state in which the syringe, the pipette tip, and the sample container are integrated.

In FIGS. 1 and 2, a pipette tip 10, a syringe (corresponding to an injector) 11, and a sample container 12 are used, for example, to test blood sampled from a living body. In a case where injecting blood (corresponding to liquid) from the syringe 11 into the sample container 12, the pipette tip 10 is attached to the syringe 11 and used.

The syringe 11 has a cylinder 11A, having a cylindrical shape, and a plunger 11B (see FIGS. 11A and 11B) inserted into the cylinder 11A. In the longitudinal direction of the cylinder 11A, the plunger 11B is inserted from the proximal end side, and a small-diameter portion 11C is formed at the distal end side. An opening, through which blood is suctioned into the cylinder 11A or blood is ejected from the inside of the cylinder 11A, is formed in the small-diameter portion 11C.

The pipette tip 10 also has a tubular shape, and the pipette tip 10 is attachably and detachably attached to the small-diameter portion 11C.

In a case where injecting blood from the syringe 11 into the sample container 12, the pipette tip 10 is attached to the small-diameter portion 11C. After the pipette tip 10 has been attached, as illustrated in FIG. 2, a distal end portion 20 of the pipette tip 10 is inserted into an injection opening 12A of the sample container 12. In this state, blood is injected into the sample container 12 from the syringe 11 through the pipette tip 10.

The sample container 12 is a container that is used, for example, in a blood test, to separate blood into a blood plasma component (or a blood serum component) and a blood cell component composed of red blood cells and white blood cells. The sample container 12 is a centrifugal separation container that is used to centrifugally separate the components of blood by using the difference in specific gravity between the components. The components of the blood are separated as the substantially cylindrical body of the sample container 12 rotates around the axis.

The pipette tip 10 and the sample container 12 are provided as, for example, a disposable type (throwaway type) kit, and is used for each test sample of blood. In addition, the syringe 11 may be of a disposable type.

In FIG. 1, a chain line CA is the central axis of the pipette tip 10, the syringe 11, and the sample container 12, each of which is a tubular member. In FIGS. 1 and 2, an arrow ED indicates the ejection direction of blood.

Figure 3:
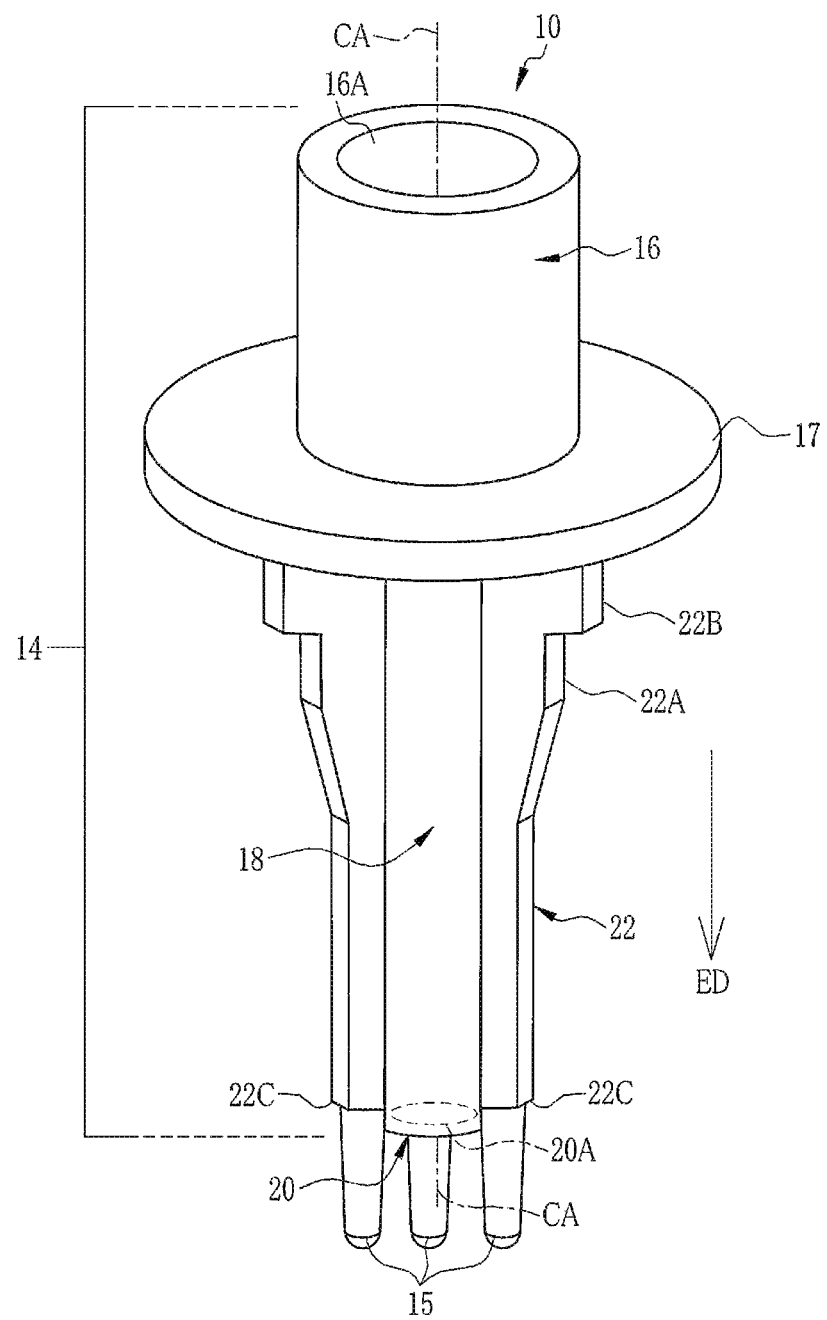
FIG. 3 is a perspective view of the pipette tip.
Figure 4:
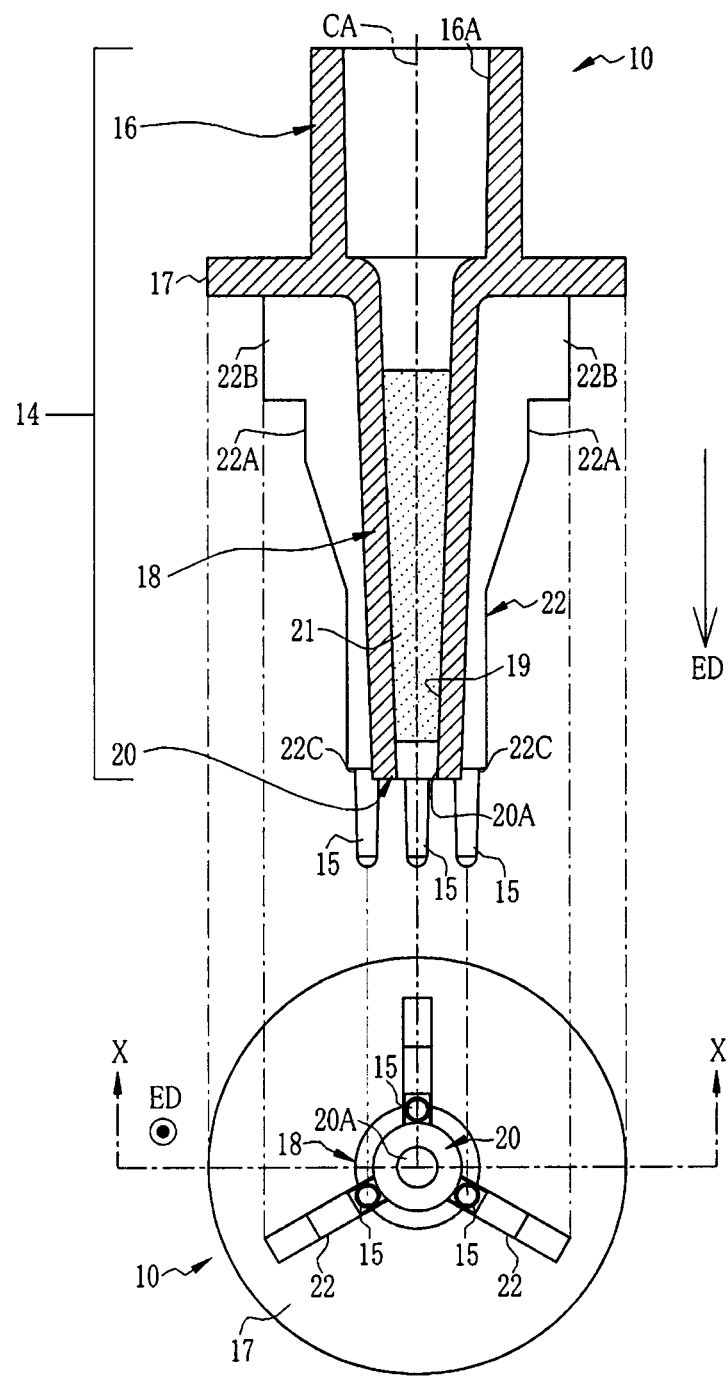
FIG. 4 shows a longitudinal sectional view (taken along section X-X) and a plan view of the pipette tip.

In FIGS. 3 and 4, the pipette tip 10 is composed of a substantially cylindrical body 14 and projections 15. The body 14 and the projections 15 are integrally formed from, for example, a transparent resin, such as polyethylene, polypropylene, or polystyrene. The body 14 has a fitting portion 16 at the proximal end side thereof in the longitudinal direction along the central axis CA. The fitting portion 16 has a cylindrical shape having an inside diameter that is substantially the same as the outside diameter of the small-diameter portion 11C of the syringe 11. The fitting portion 16 is fitted onto the small-diameter portion 11C in such a way that the small-diameter portion 11C is inserted into a fitting hole 16A (see FIGS. 11A and 11B).

The body 14 has a flange 17 and a nozzle portion 18 on the distal end side of the fitting portion 16. The flange 17 is a disc that is centered at the central axis CA, that protrudes in a direction perpendicular to the central axis CA, and that is located at the boundary between the fitting portion 16 and the nozzle portion 18. The flange 17 functions as a holding portion for holding the pipette tip 10.

The nozzle portion 18 has a substantially cylindrical shape in which a flow passage 19 centered at the central axis CA is formed. Blood from the syringe 11 flows through the flow passage 19 toward an ejection opening 20A. The flow passage 19 communicates with the fitting hole 16A of the fitting portion 16. The flow passage 19 has, for example, a tapered shape whose diameter becomes smaller than that of the fitting hole 16A in the nozzle portion 18 and whose diameter gradually decreases from the proximal end side of the nozzle portion 18 (the flange 17 side) toward the distal end portion 20 (the downstream side in the ejection direction ED). In accordance with the shape of the flow passage 19, the outer shape of the nozzle portion 18 is also a tapered shape whose diameter gradually decreases toward the distal end portion 20.

The dimensions of the body 14 are, for example, as follows: the length of the body 14 in the direction of the central axis CA is about 20 mm; the diameter of the fitting portion 16 is about 6 mm; the diameter of the flange 17 is about 12 mm; and the diameter of the nozzle portion 18 at the distal end portion 20 is about 4 mm.

For example, an anticoagulant 21 for suppressing coagulation of blood, such as heparin, is applied to the flow passage 19. Because blood tends to coagulate when contacting air, coagulation of blood is prevented by adding the anticoagulant 21 to blood that passes through the flow passage 19 when being injected into the sample container 12.

The ejection opening 20A, which has a circular shape centered at the central axis CA, is formed in the distal end portion 20. The ejection opening 20A communicates with the fitting hole 16A via the flow passage 19. Blood that has been ejected from the small-diameter portion 11C of the syringe 11 and has flowed through the flow passage 19 of the nozzle portion 18 is ejected from the ejection opening 20A of the distal end portion 20.

Ribs 22, which protrude in the radial direction of the nozzle portion 18 (direction perpendicular to the central axis CA), are formed on the outer peripheral surface of the nozzle portion 18. The ribs 22 are elongated thin plates that extend in the longitudinal direction of the nozzle portion 18 (direction that coincides with the central axis CA). The ribs 22 extend over substantially the entire length of the nozzle portion 18 in the longitudinal direction. To be more specific, the ribs 22 are formed from the flange 17 to the distal end portion 20.

For example, the ribs 22 are disposed at three positions in the circumferential direction around the axis of the nozzle portion 18. The three ribs 22 in the present example are disposed at regular intervals in the circumferential direction, and the interval between the ribs 22 is 120° (360°/3).

The sum of the amount of protrusion of the ribs 22 from the outer periphery of the nozzle portion 18 and the outside diameter of the nozzle portion 18 is smaller than the inside diameter of the injection opening 12A on the distal end portion 20 side (the downstream side in the ejection direction ED). The ribs 22 each have a fitting portion 22A in a middle part thereof toward the flange 17 side (the upstream side in the ejection direction ED). The sum of the amount of protrusion of the fitting portions 22A and the outside diameter of the nozzle portion 18 is equal to or a slightly larger than the inside diameter of the injection opening 12A. In a case where the nozzle portion 18 is inserted into the injection opening 12A until the fitting portions 22A are inserted, the injection opening 12A and the fitting portions 22A are fitted to each other, and the pipette tip 10 can be fixed to the sample container 12 (see FIG. 11A).

A part of the each of the fitting portions 22A on the distal end portion 20 side is a tapered part whose protruding amount decreases toward the distal end portion 20. The nozzle portion 18 is inserted into the injection opening 12A while the ribs 22 are in contact with the inner edge of the injection opening 12A. During this insertion, the tapered parts function as guide surfaces for allowing the fitting portions 22A to smoothly reach the injection opening 12A.

In each of the ribs 22, a stopper 22B is formed on the flange 17 side of the fitting portion 22A. The sum of the amount of protrusion of the stoppers 22B and the outside diameter of the nozzle portion 18 is larger than the inside diameter of the injection opening 12A, and the stoppers 22B restrict the amount of insertion of the nozzle portion 18 into the injection opening 12A.

In a case where the nozzle portion 18 is inserted into the injection opening 12A of the sample container 12, the ribs 22 serve to provide an air passage between the outer periphery of the nozzle portion 18 and the injection opening 12A. In a case where the nozzle portion 18 is inserted into the injection opening 12A, the fitting portions 22A of the ribs 22 are fitted into the injection opening 12A (see FIG. 11A).

In this state, parts of the outer peripheral surface of the nozzle portion 18 on which the ribs 22 are not provided are separated from the injection opening 12A and gaps are formed. The gaps serve as an air passage through which the inside and the outside of the sample container 12 communicate with each other. Since the air passage is provided, in a case where injecting blood into the sample container 12, air inside the sample container 12 can be smoothly replaced with liquid from the outside of the sample container 12, and therefore injection can be performed smoothly.

The projections 15 have shapes that project in the ejection direction ED from a region around the ejection opening 20A of the distal end portion 20. The projections 15 are integrally formed with the distal end portion 20. The projections 15 are partially disposed around the central axis CA.

Figure 5:
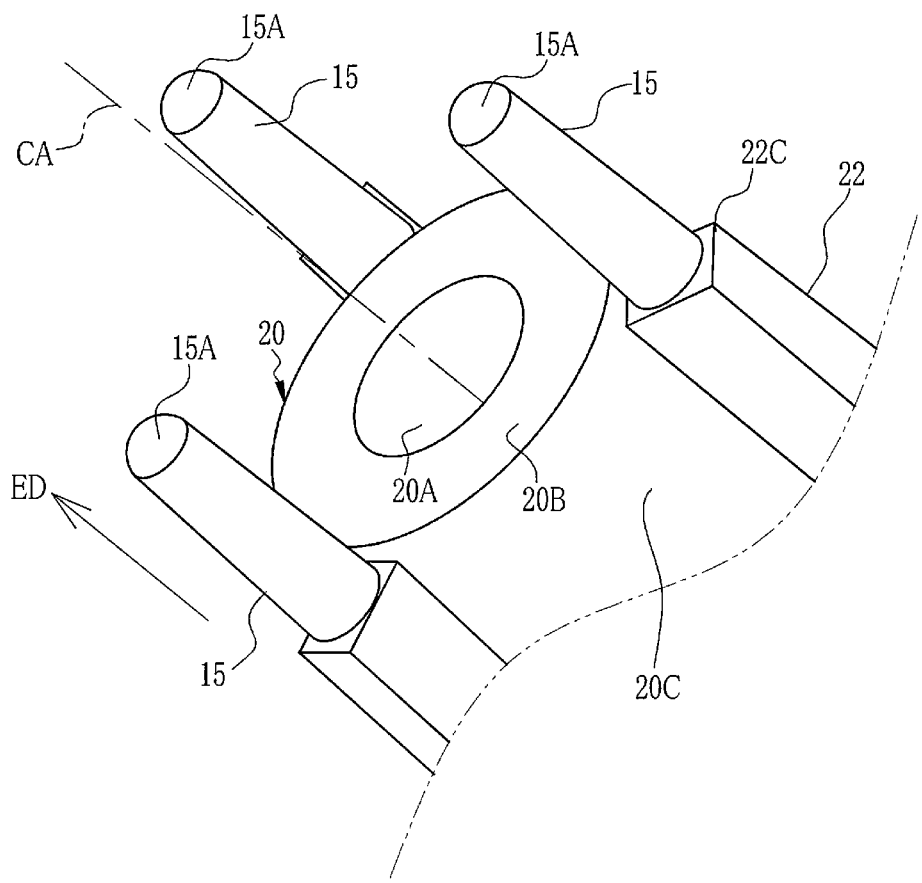
FIG. 5 is an enlarged perspective view of the vicinity of a distal end portion.

To be more specific, as illustrated in FIG. 5, which is an enlarged perspective view of the vicinity of the distal end portion 20, in the present example, three projections 15 are disposed at intervals in the circumferential direction around the central axis CA. Each of the three projections 15 is provided on a distal end surface 22C of a corresponding one of the three ribs 22. As with the ribs 22, the three projections 15 are disposed in the circumferential direction around the central axis CA at regular intervals (at 120° intervals, because the number of the projections 15 is three). Each of the projections 15 has a columnar shape extending in a longitudinal direction that is the ejection direction ED.

Figure 6:
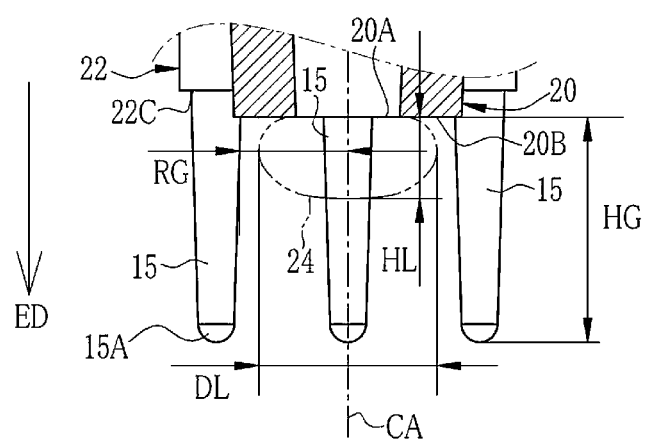
FIG. 6 is an enlarged sectional view of the vicinity of the distal end portion.

As illustrated in FIG. 6, in a case where blood is ejected from the nozzle portion 18, as shown by a two-dot-chain-line ellipse, blood near the ejection opening 20A remains at the ejection opening 20A of the distal end portion 20 due to surface tension in a state in which the blood protrudes from the ejection opening 20A, thereby forming a residual droplet 24. When withdrawing the pipette tip 10 from the injection opening 12A of the sample container 12, the projections 15 prevent the residual droplet 24, which remains at the ejection opening 20A, from adhering to the injection opening 12A and the vicinity of the injection opening 12A.

In a case where adhesion of the residual droplet 24 is prevented, the reliability of measurements of a blood test is ensured, and, in addition, contamination of a centrifuge 46 (see FIG. 10) is suppressed. That is, after blood has been injected, the sample container 12 is mounted in the centrifuge 46 and rotated. Due to centrifugal separation, the blood in the sample container 12 is separated into a blood cell component and a blood plasma component. After centrifugal separation, if unseparated blood adhering to the vicinity of the injection opening 12A drops into the sample container 12, the reliability of measurements of chemical components in the blood test decreases.

If the sample container 12 is rotated in a state in which the residual droplet 24 adheres to the vicinity of the injection opening 12A, the residual droplet 24 splashes and contaminates the inside of the centrifuge 46. If the droplet splashed to the inside of the centrifuge 46 is not removed, the droplet may drop into a sample container for another living body. In this case, the droplet may cause errors in the measurements of a blood test of the other living body. Such trouble can be avoided by preventing adhesion of the residual droplet 24.

Preferably, the length HG of each of the projections 15 satisfies the condition of the following expression (1), where HL is the maximum length of the residual droplet 24 in the ejection direction ED. To be specific, the length HG is a length from the position of the ejection opening 20A in the ejection direction ED (direction of the central axis CA) and is a length from a distal end surface 20B of the distal end portion 20 in which the ejection opening 20A is formed. The size of the residual droplet 24 is determined, for example, by measuring a droplet that remains in the vicinity of the ejection opening 20A when whole blood having a hematocrit in the range of 35% to 55% is ejected from the nozzle portion 18 in a case where the material of the nozzle portion 18 is polypropylene (PP) and the inside diameter φ, of the ejection opening 20A is φ1.18 mm.

$$HL \leq HG \qquad \text{Expression (1)}$$

In a case where the length HG of each of the projections 15 satisfies this condition, a region around the residual droplet 24 can be reliably guarded by the projections 15. Thus, contact between the residual droplet 24 and the injection opening 12A can be prevented.

Regarding the distance between the plurality of projections 15, preferably, the distance RG satisfies a condition of the following expression (2), where RG is the distance from the center of the ejection opening 20A (central axis CA) to each of the projections 15 in the radial direction, and DL is the maximum width of the residual droplet 24 that remains at the ejection opening 20A in the radial direction of the ejection opening 20A.

$$DL/2 \leq RG \qquad \text{expression (2)}$$

In a case where the distance RG satisfies this condition, contact between the residual droplet 24 and the projections 15 in the radial direction can be reduced, and thereby the residual droplet 24 does not easily adhere to the projections 15.

If the outside diameter of each of the projections 15 varies in the longitudinal direction (direction of the central axis CA), the distance RG also varies. In such a case, for example, the minimum value in the direction of the central axis CA is used as the distance RG. If the minimum value satisfies the conditional expression (2), the conditional expression (2) is satisfied over the entire length of each of the projections 15 in the longitudinal direction.

Instead of the minimum value, the maximum value or the average value may be used as the distance RG. In this case, the conditional expression (2) may not be satisfied at some positions on each of the projections 15 in the longitudinal direction. However, even in this case, a certain effect can be obtained.

For example, the length of each of the projections 15 in the longitudinal direction is about 2 mm, and the diameter of each of the projections 15 is about 1 mm.

Each of the projections 15 has a cylindrical columnar shape having a circular cross section. A cylindrical columnar shape has the following advantage over a prismatic columnar shape. That is, as illustrated in FIG. 1, the pipette tip 10 is inserted into the sample container 12 in a position such that distal ends 15A of the projections 15 are lower ends in the vertical direction.

After ejecting blood from the ejection opening 20A and injecting the blood, the pipette tip 10, inserted into the sample container 12, is withdrawn to the outside of the sample container 12. When blood is being ejected, the blood adheres to the projections 15, which are located in the vicinity of the ejection opening 20A. In the case of a cylindrical columnar shape, in contrast to a prismatic columnar shape, the outer peripheral surface of each of the projections 15 does not have a corner. Therefore, even in a case where blood adheres, the blood can be shed smoothly.

Therefore, even in a case where blood adheres to the projections 15, the blood slides down toward the distal ends 15A by gravity and drops downward, so that the blood is not easily trapped by the projections 15. When the pipette tip 10 is withdrawn from the sample container 12, the projections 15 pass through the injection opening 12A. However, because blood is not trapped by the projections 15, even in a case where the projections 15 and the injection opening 12A contact each other, blood does not adhere to the injection opening 12A from the projections 15.

For the same purpose of preventing the projections 15 from trapping blood, the distal ends 15A of the projections 15 are rounded and do not have corners. Each of the projections 15 has a tapered shape whose diameter decreases from the proximal end side toward the distal end 15A. Such a shape is used also in order to allow blood adhered to the projections 15 to easily slide downward and to prevent the projections 15 from trapping the blood.

At the distal end portion 20, each of the projections 15 is provided in such a way that a gap is not formed between the projection 15 and an outer peripheral surface 20C of the distal end portion 20 around the central axis CA in a width direction perpendicular to the direction of the central axis CA of the distal end portion 20 (the radial direction of the ejection opening 20A).

If there is a gap between each of the projections 15 and the distal end portion 20, blood ejected from the ejection opening 20A or the residual droplet 24 may flow into the gap due to capillary action and may adhere to the outer peripheral surface 20C of the distal end portion 20 or a proximal end portion of the projection 15. For example, as illustrated in FIG. 1 of JP2011-214842A, if a cover is provided around a distal end portion of a nozzle having an ejection opening in such a way that a gap is formed between the cover and an outer peripheral surface of the distal end portion around the axis, blood may flow in from the gap between the outer peripheral surface of the distal end portion and the cover, and blood may adhere to the cover. In order to prevent such adhesion of blood, each of the projections 15 is formed in such a way that a gap is not formed between the projection 15 and the outer peripheral surface 20C.

In the present example, the ribs 22, which protrude from the outer peripheral surface 20C of the distal end portion 20, extend to positions that are substantially the same as that of the distal end surface 20B of the distal end portion 20, and the projections 15 stand on the distal end surfaces 22C of the ribs 22. Therefore, a gap, into which blood may flow, does not exist between each of the projections 15 and the outer peripheral surface 20C of the distal end portion 20. Thus, adhesion of blood to the outer peripheral surface 20C of the distal end portion 20 or the proximal end portions of the projections 15 is prevented.

The projections 15 may be provided, not on the distal end surfaces 22C the ribs 22, but directly on the outer peripheral surface 20C or the distal end surface 20B of the distal end portion 20.

Figure 7:
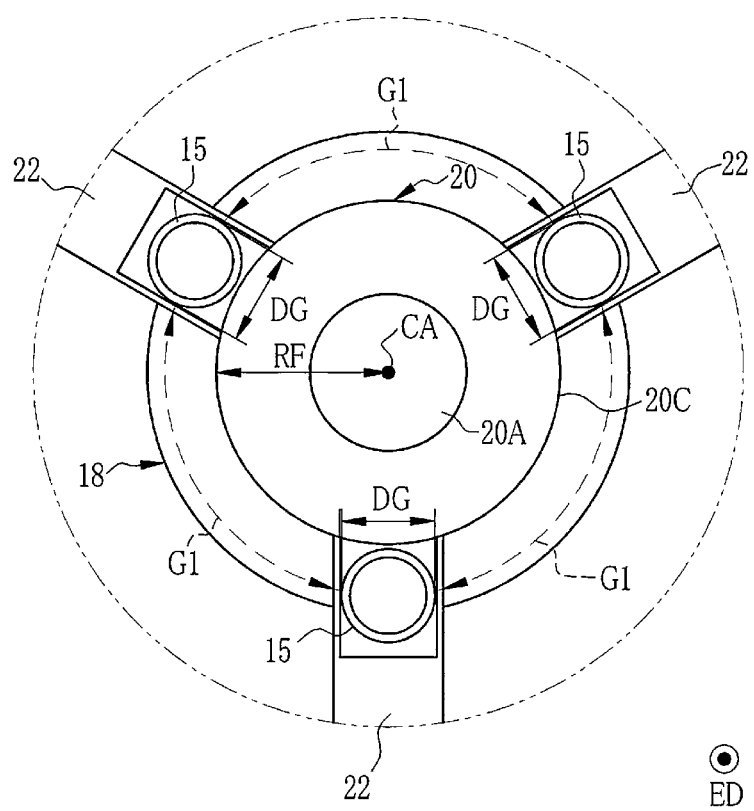
FIG. 7 is an enlarged plan view of the vicinity of the distal end portion.

As illustrated in FIG. 7, the three projections 15 are disposed at intervals G1 around the central axis CA. For example, the occupancy ratio of the projections 15 to the entire circumference around the central axis CA is in the range of 3% to 10%. Here, the occupancy ratio is 100% in a case where the projection has a cylindrical shape that does not have an interval G1 and extends along the entire circumference around the central axis CA. In the present example, the phrase "the occupancy ratio of the projections 15 is in the range of 3% to 10%" means that the sum of the widths DG of the projections 15 in the circumferential direction around the central axis CA is in the range of 3% to 10% of the circumference around the central axis CA in the case where the projection extends along the entire circumference.

To be specific, the condition that the occupancy ratio of the projections 15 to the entire circumference around the central axis CA is in the range of 3% to 10% is represented by the following expression (3), where, as shown in FIG. 7, RF is the radius of the distal end portion 20, DG is the width of each of the projections 15 in the circumferential direction, and N is the number of the projections 15.

$$0.03 \times 2\pi RF \leq N \times DG \leq 0.1 \times 2\pi RF \quad (3)$$

The radius RF of the distal end portion 20 is, for example, 1.45 mm, and the width DG of each of the projections 15 in the circumferential direction is, for example, 0.2 mm. In this case, the occupancy ratio of the projections 15 to the entire circumference around the central axis CA is 0.6/9.11≈0.066=6.6% and the above condition is satisfied, because the circumference of the distal end portion 20 is 1.45×2×π≈9.11 mm, the number of the projections 15 is 3, and the sum of the widths DG of the three projections 15 in the circumferential direction is 3×0.2 mm=0.6 mm.

The lower the occupancy ratio of the projections 15, the smaller the widths DG of the projections 15. As the widths DG become smaller, the area of contact with blood decreases, and trapping of blood by the projections 15 is prevented. Therefore, in view of prevention of trapping of blood, it is preferable that the occupancy ratio of the projections 15 is as low as possible. On the other hand, if the widths of the projections 15 are too small, the projections 15 may not have sufficient rigidity. Therefore, as a lower limit for providing the projections 15 with sufficient rigidity, preferably, the occupancy ratio is 3% or higher.

Figure 8:
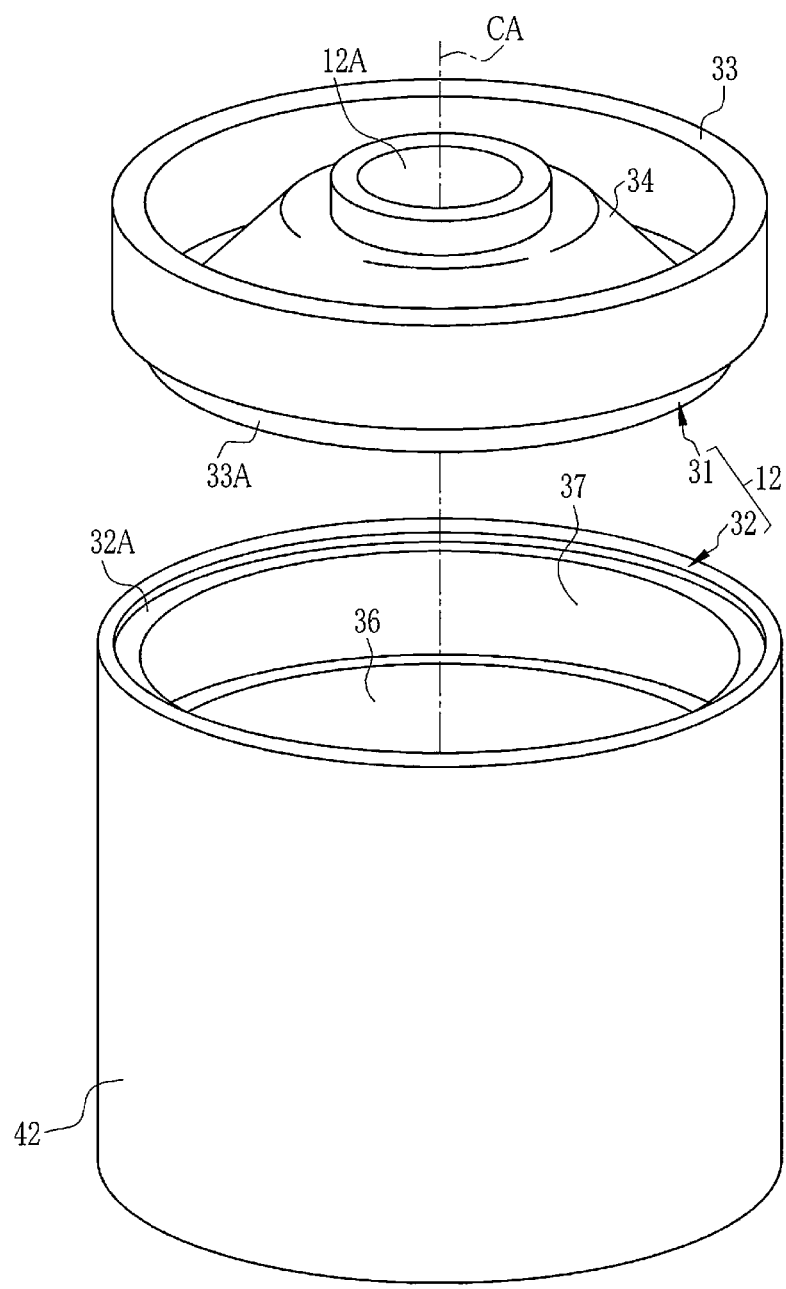
FIG. 8 is an exploded perspective view of the sample container.
Figure 9:
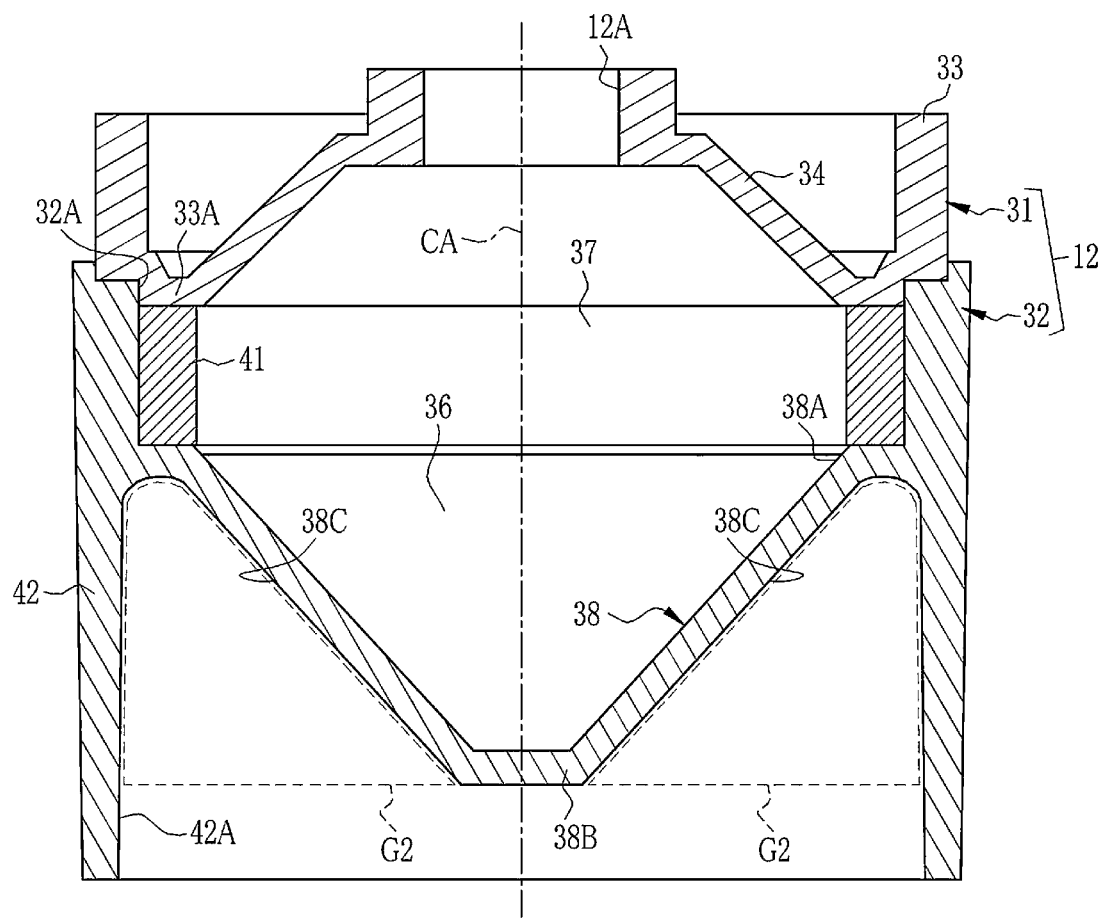
FIG. 9 is a sectional view of the sample container.

In FIGS. 8 and 9, the sample container 12 is composed of a lid member 31 and a body member 32. These members 31 and 32 each have a cylindrical outer shape and, and, as with the pipette tip 10, are each integrally formed from a transparent resin.

The lid member 31 includes an outer peripheral portion 33 and an inner peripheral portion 34. The inner peripheral portion 34 has a substantially conical shape whose inside is hollow, and the injection opening 12A is formed at the top thereof. The outer peripheral portion 33 has an annular shape surrounding the inner peripheral portion 34. A fitting portion 33A, which has a slightly smaller outside diameter than the outer peripheral portion 33, is formed at the lower end of the outer peripheral portion 33. The fitting portion 33A is fitted into the body member 32.

The body member 32 includes a storage portion 36 for storing blood and a trap portion 37 for trapping a blood cell component of the blood. The storage portion 36 has a space having an inverted conical shape. This space is defined by a housing 38 that is funnel-shaped such that the diameter thereof decreases from an upper part 38A toward a bottom part 38B. Because the housing 38 is funnel-shaped, an outer peripheral surface 38C is inclined relative to the central axis CA.

The trap portion 37 is a disc-shaped space that is connected to the upper part 38A of the housing 38 and that has a slightly larger diameter than the upper part 38A. A separation medium (also called a "separation gel") 41 is disposed in the trap portion 37. As the separation medium 41, a material that has a specific gravity between the specific gravities of two components of blood to be centrifugally separated, which are specifically a blood plasma component and a blood cell component, and that has a thixotropic property is appropriately selected.

In an upper part of the trap portion 37, a fitting portion 32A, which is to be fitted onto the fitting portion 33A of the lid member 31, is provided. The lid member 31 and the body member 32 are welded together in a state in which the fitting portions 33A and 32A are fitted to each other.

In the body member 32, an annular portion 42 is provided outside of the storage portion 36 of the housing 38. The annular portion 42 has an annular shape that surrounds the entire circumference of the inclined outer peripheral surface 38C of the housing 38. Due to this shape, a gap G2, which is shown by a broken line, is formed between an inner peripheral surface 42A of the annular portion 42 and the outer peripheral surface 38C of the housing 38. The gap G2 is a recess that allows the sample container 12 to be fitted onto a mount portion of the centrifuge 46 illustrated in FIG. 10.

Figure 10:
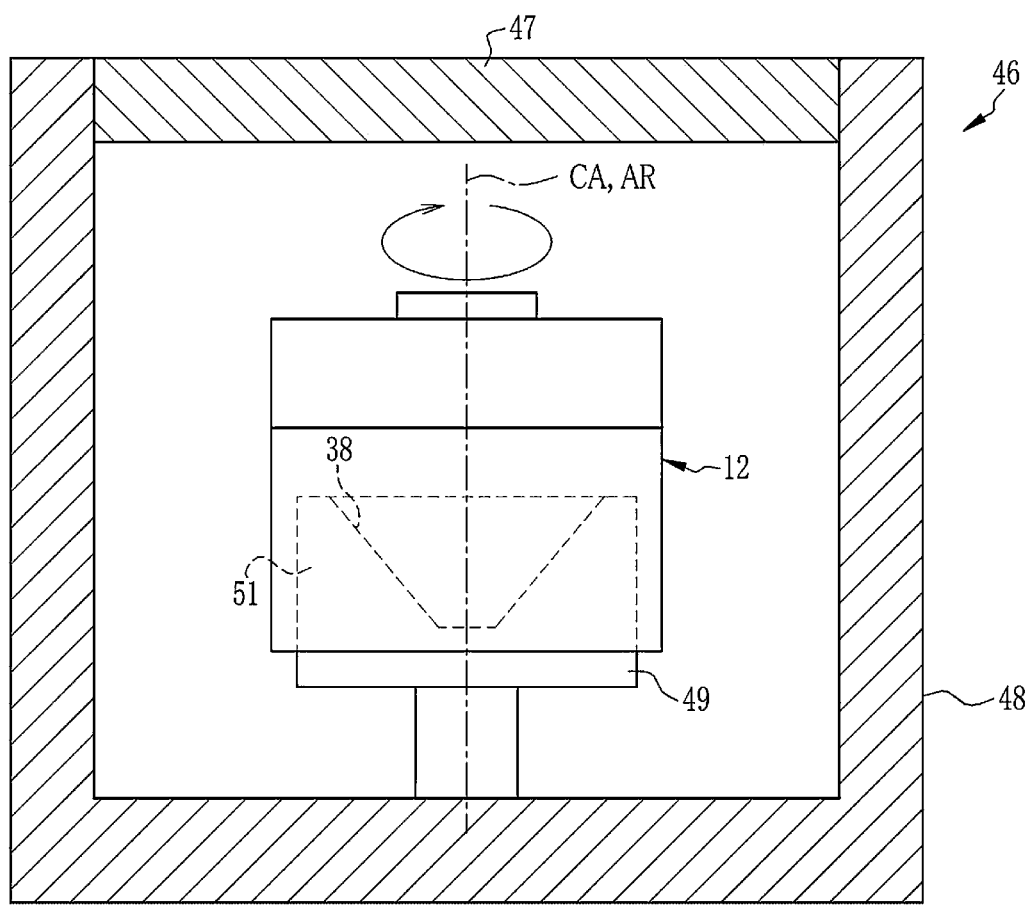
FIG. 10 illustrates a centrifuge.

As illustrated in FIG. 10, the centrifuge 46 includes, for example, a lid 47 that can be opened or closed, a housing 48 that forms a space for containing the sample container 12, and a turntable 49 that is disposed in the space and on which the sample container 12 is mounted.

The turntable 49 is rotated by a rotation mechanism (not shown), such as a motor, around a rotation axis AR in the direction shown by an arrow. In the turntable 49, a mount portion 51, which is inserted into the gap G2 and fitted to the housing 38 and the annular portion 42, is formed. By being mounted on the mount portion 51, the sample container 12 is fixed to the turntable 49 in a state in which the central axis CA coincides with the rotation axis AR of the turntable 49. In this state, the sample container 12 is rotated by the motor, and blood is centrifugally separated.

Next, the advantageous effects of the aforementioned structure will be described with reference to FIGS. 11A and 11B to 14. As illustrated in FIGS. 11A and 11B, in a case where performing a blood test, blood BL, which has been sampled from a living body, is injected into the sample container 12 from the syringe 11. Before injection, the pipette tip 10 is attached to the syringe 11. The sample container 12 is fixed to a base 52.

Then, as illustrated in FIG. 11A, the nozzle portion 18 of the pipette tip 10 is inserted into the injection opening 12A of the sample container 12 from the distal end portion 20. The pipette tip 10 is inserted into the injection opening 12A until the ribs 22 are fitted into the injection opening 12A and the insertion amount is restricted by the stopper 22B (see FIG. 4).

In the state in which the pipette tip 10 is inserted, the plunger 11B is pushed in the cylinder 11A in the ejection direction ED. Thus, pressure is applied to the blood BL in the cylinder 11A and the blood BL is ejected. The blood BL passes through the flow passage 19 of the pipette tip 10, reaches the ejection opening 20A of the distal end portion 20 while being mixed with the anticoagulant 21, and is ejected from the ejection opening 20A. Due to the ejection, the blood BL is injected into the sample container 12, and the injected blood BL is stored in the storage portion 36.

As illustrated in FIG. 11B, the blood BL is injected until the liquid surface reaches a target height TH in the storage portion 36. Then, in a case where the liquid surface of the blood BL reaches the target height TH and a predetermined amount of the blood BL is injected into the storage portion 36, injection is finished. In a case where injection finishes, the pipette tip 10 is withdrawn from the injection opening 12A.

At this time, if the blood BL remains in the syringe 11 and in the flow passage 19, the blood BL at the ejection opening 20A protrudes from the ejection opening 20A in the ejection direction ED due to surface tension and adheres to the ejection opening 20A as the residual droplet 24.

Figure 12:
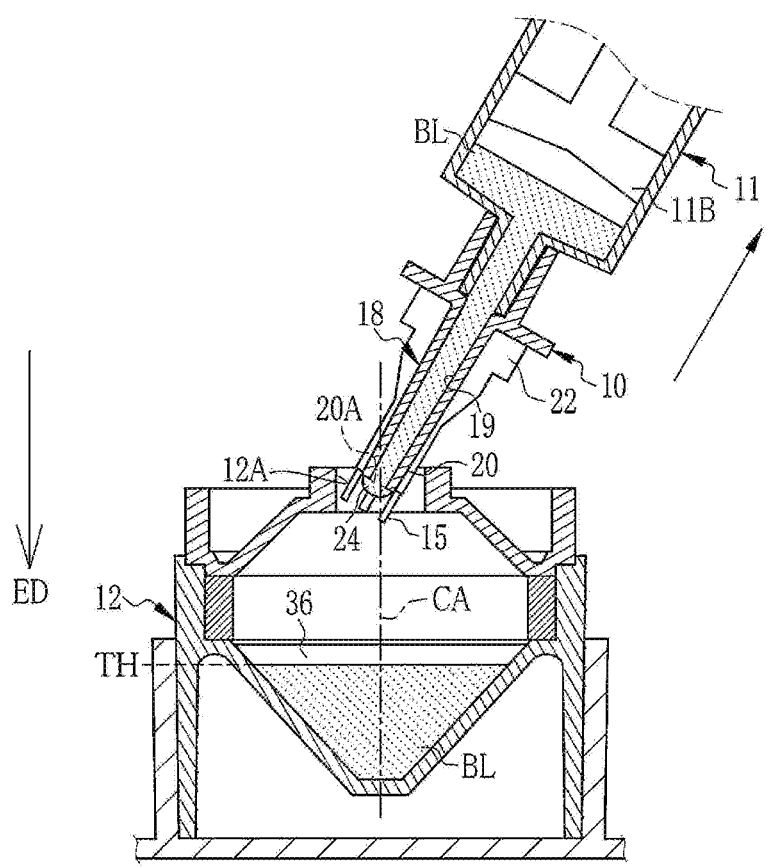
FIG. 12 illustrates a state in which the pipette tip is inclined.

In a case where withdrawing the pipette tip 10 from the injection opening 12A, there may be a case where the pipette tip 10 is straightly withdrawn so as to be parallel to the central axis CA of the injection opening 12A as illustrated in FIG. 11B, or there may be a case where the pipette tip 10 is withdrawn while being twisted so as to loosen the fitting of the ribs 22 and the injection opening 12A as illustrated in FIG. 12.

In this case, as illustrated in FIG. 12, the pipette tip 10 inclines relative to the central axis CA of the injection opening 12A. Even in this state, because the projections 15 are disposed around the ejection opening 20A, the region around the residual droplet 24 is guarded by the projections 15. Therefore, the residual droplet 24 does no adhere to the injection opening 12A.

Figure 13:
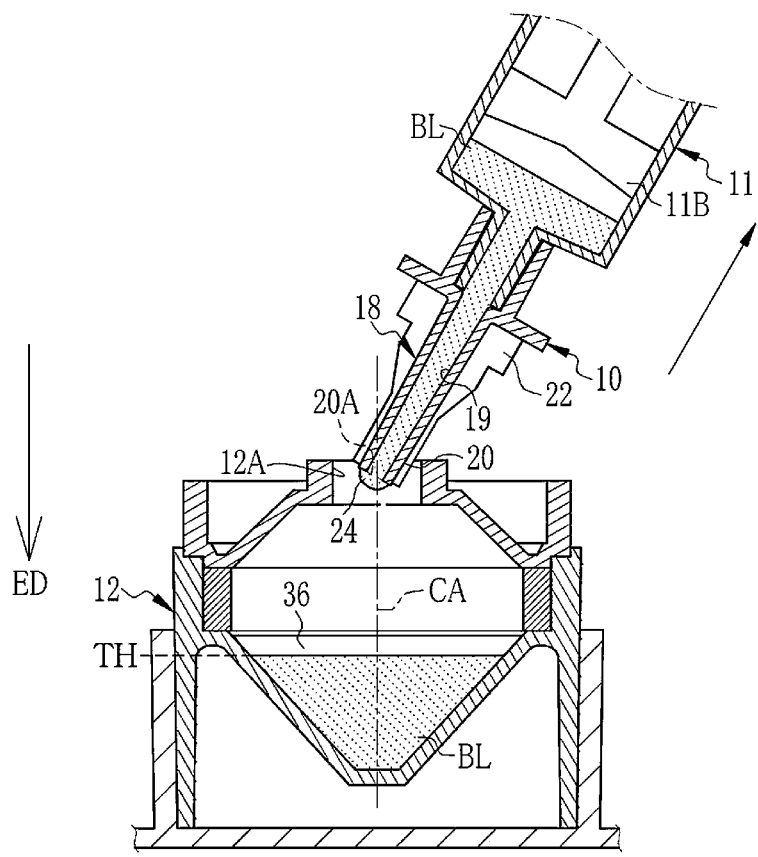
FIG. 13 is illustrates a pipette tip according to a comparative example.

In contrast, as in a comparative example illustrated in FIG. 13, if the projections 15 are not provided, the region around the residual droplet 24 is not guarded. Therefore, in a case where the pipette tip 10 inclines, the residual droplet 24 may adhere to the injection opening 12A. FIG. 13 differs from the present invention illustrated in FIG. 12 in that the projections 15 are not provided, and is the same in all other respects.

The projections 15 are not disposed along the entire circumference around the central axis CA but are partially disposed. Therefore, compared with a case where the projections 15 are disposed along the entire circumference, the area of contact with blood is reduced. Therefore, trapping of blood by the projections 15 is prevented.

To be more specific, the cover shown in FIGS. 1 to 3 of JP2011-214842A, which is described above as a related technology, has a tubular shape that covers the entire outer periphery of a region around the ejection opening in the distal end portion of the nozzle. Therefore, the area of contact with blood is large, and blood ejected from the ejection opening is easily trapped by the cover. If blood is trapped by the cover, the blood adhering to the cover may adhere to the injection opening 12A of the sample container 12.

Compared with the related technology, because the projections 15 are partially disposed around the central axis CA, the area of contact with blood is small and blood is not easily trapped. Therefore, blood does not adhere to the injection opening 12A from the projections 15. Thus, it is possible to reliably prevent adhesion of the residual droplet 24 to the injection opening 12A.

Moreover, as shown by the conditional expression (3), because the occupancy ratio of the projections 15 to the entire circumference around the central axis CA is lower than or equal to 10%, the area of contact with blood is reduced, and trapping of blood by the projections 15 is prevented.

Because the three projections 15 are disposed at regular intervals in the circumferential direction, even in a case where the pipette tip 10 inclines in any direction, contact between the residual droplet 24 and the injection opening 12A can be prevented.

Because each of the projections 15 has the length HG that satisfies the condition of the expression (1) as shown in FIG. 6, contact between the residual droplet 24 and the injection opening 12A can be reliably guarded. Because each of the projections 15 is disposed at the distance RG that satisfies the condition of the expression (2), contact between the residual droplet 24 and the projections 15 in the radial direction can be reduced, and therefore the residual droplet 24 does not easily adhere to the projections 15.

After the pipette tip 10 has been withdrawn, the sample container 12 is set in the centrifuge 46, and centrifugal separation of the blood BL is performed. Although the sample container 12 is rotated at high speed in the centrifuge 46, the blood BL does not splash to the inside of the centrifuge 46, because the blood BL does not adhere to the injection opening 12A due to the effect of the projections 15.

Figure 14:
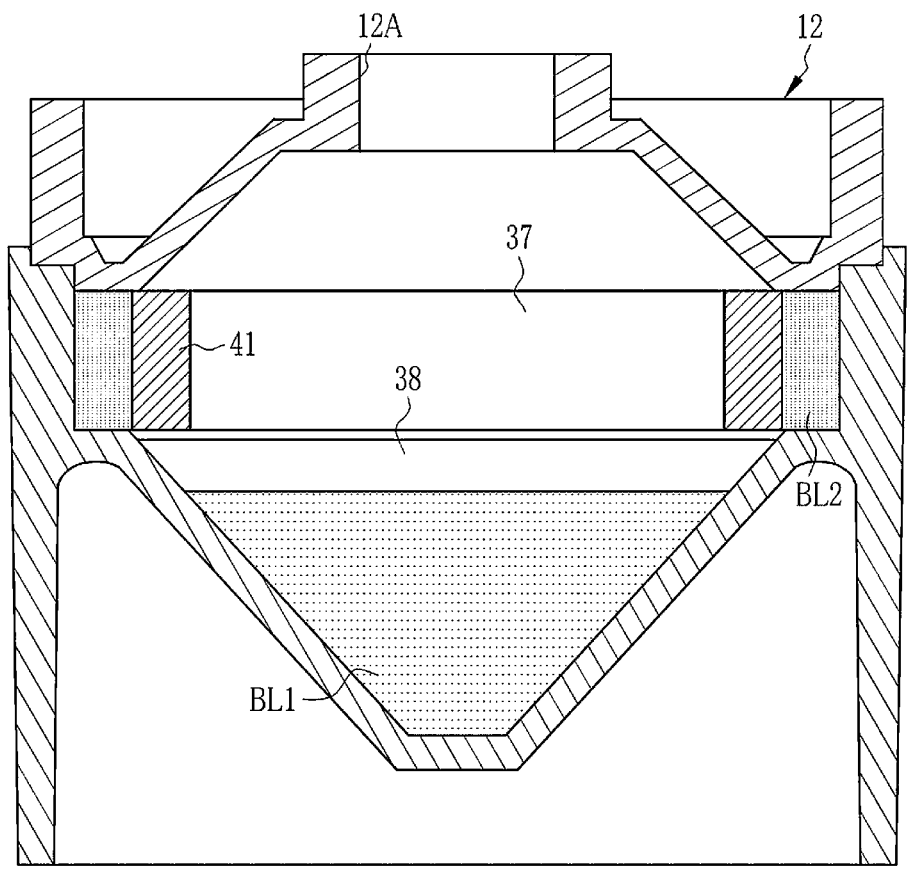
FIG. 14 illustrates a state after blood has been centrifugally separated in the sample container.

As illustrated in FIG. 14, in a case where centrifugal separation finishes, a blood cell component BL2, whose specific gravity is larger than that of the separation medium 41, is trapped by the separation medium 41 in the trap portion 37. After rotation finishes, a blood plasma component BL1, whose specific gravity is smaller than that of the separation medium 41, flows from the trap portion 37 to the storage portion 36 by gravity, and is stored in the storage portion 36. Thus, centrifugal separation of blood is completed.

The blood BL before being separated does not adhere to the injection opening 12A due to the effect of the projections 15. Therefore, the blood BL before being separated does not drop into the storage portion 36 from the injection opening 12A and is not mixed into the blood plasma component BL1.

In the present example, as an example of partially disposing the projections 15 around the central axis CA, the three projections 15 are disposed at regular intervals. However, this is not a limitation. The phrase "the projections 15 are partially disposed around the central axis CA" means that the projections 15 are not disposed along the entire circumference around the central axis CA but at least a part of the projections 15 in the circumferential direction is void.

Therefore, for example, the number of the projections 15 may be four or more or may be one. In cases where the number of the projections 15 is one or two, if the width DG of each of the projections 15 is small, the entire circumference of the residual droplet 24 cannot be guarded. Therefore, depending on the direction in which the pipette tip 10 inclines, the guard may become loose, and adhesion of the residual droplet 24 to the injection opening 12A may not be prevented. Therefore, preferably, as in the structure shown in the present example in which the three projections 15 are disposed at regular intervals, the number and the dispositions of the projections 15 may be selected so that the entire circumference can be guarded.

Even if the number of the projections 15 is one or two, it is possible to guard the entire circumference by increasing the width DG of each of the projections 15 in the circumferential direction (see FIG. 7). For example, it is possible to guard the entire circumference by disposing two projections 15, each of which having a width DG that covers an angular range of about 90° in the circumferential direction, at diagonal positions.

However, in a case where the width DG is increased, the area of contact of the projections 15 with ejected blood increases, and a disadvantage in that blood easily adheres to the projections 15 occurs. On the other hand, the number of the projections 15 may be three or more. However, about three or four is sufficient for guarding the entire circumference, and an excessively large number provides only a small advantage. Therefore, preferably, the number of the projections 15 is about three, as in the exampled described above.

By disposing the projections 15 at regular intervals as in the present example, compared with a case where a plurality of projections 15 are unevenly disposed, the entire circumference can be guarded efficiently by using a small number of the projections 15. Moreover, by disposing about three projections 15 at regular intervals, even in a case where each of the projections 15 has a columnar shape having a small width DG, the entire circumference can be guarded. Because the area of contact with blood decreases as the width DG decreases, an advantage in that blood does not easily adhere to the projections 15 can be obtained.

In the present example, each of the projections 15 has a cylindrical columnar shape. Alternatively, the shape may be a prismatic columnar shape. However, as described above, in a case where each of the projections 15 has a cylindrical columnar shape, because the projection 15 does not have a corner, the blood can be easily shed compared with case where the shape is a prismatic columnar shape. Therefore, blood is not easily trapped by the projections 15.

Modifications of Sample Container

Figure 15:
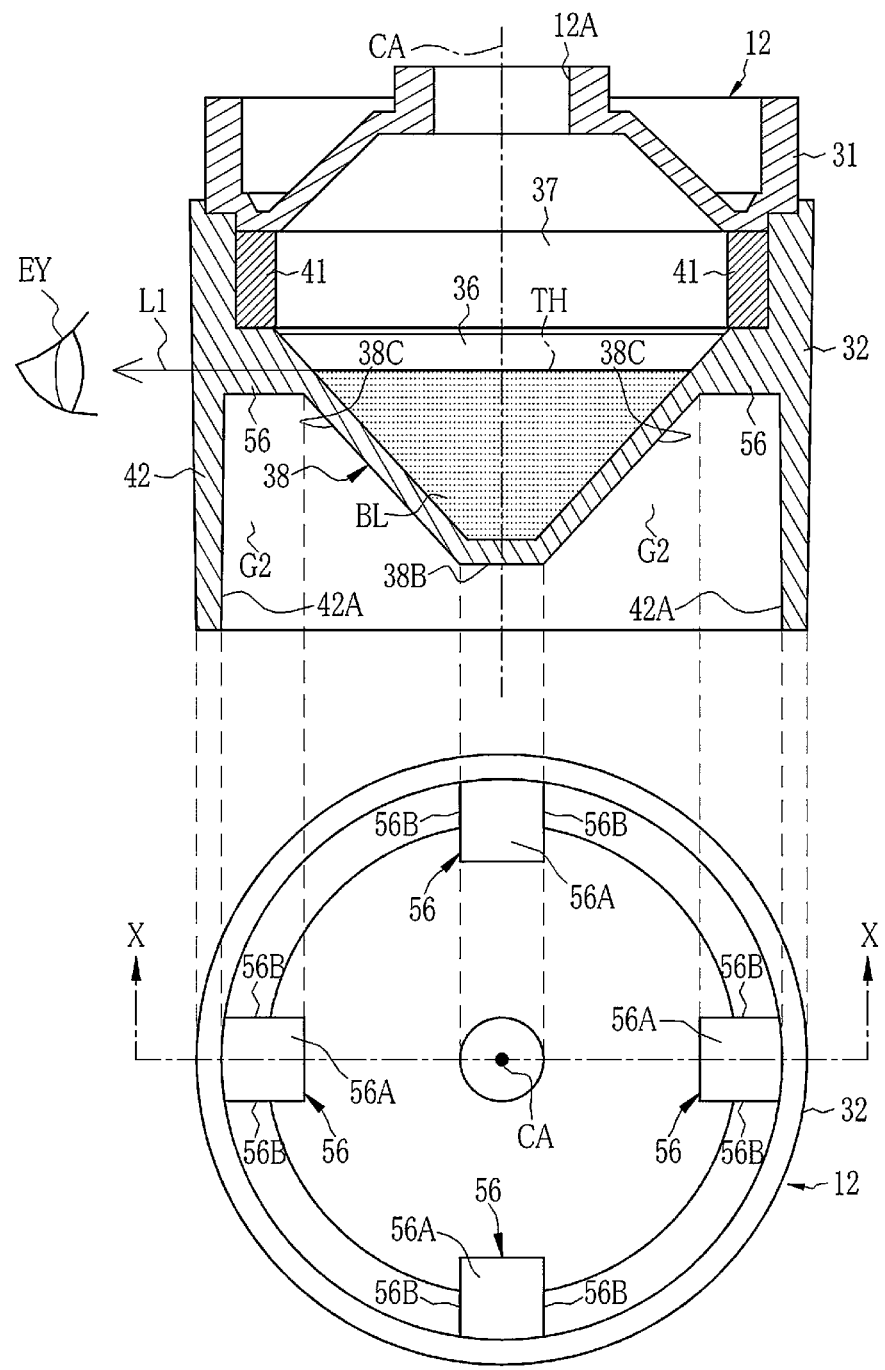
FIG. 15 shows a longitudinal sectional view (taken along section X-X) and a bottom view of the sample container.
Figure 16:
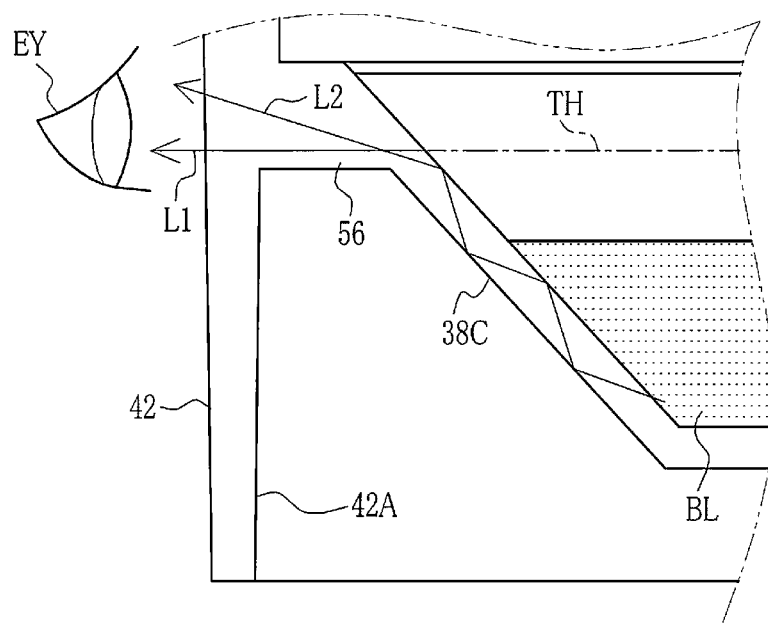
FIG. 16 illustrates harmful light L2.
Figure 17:
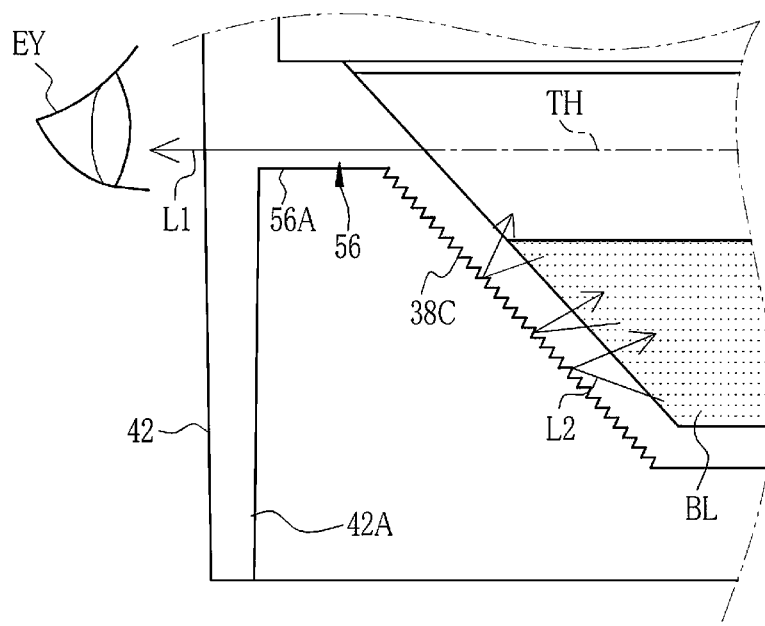
FIG. 17 illustrates surface roughening.

FIGS. 15 to 17 illustrate modifications of the sample container 12 in which light guide portions 56 are provided in the sample container 12 described above. Because elements other than the light guide portions 56 are the same, such elements will be denoted by the same numerals and descriptions thereof will be omitted. Hereinafter, the light guide portions 56, which is the difference, will be mainly described.

The light guide portions 56 guide light from the inside of the storage portion 36 to the outside of the annular portion 42. The light guide portions 56 are visual check windows for visually checking from the outside whether the liquid surface of the blood BL stored in the storage portion 36 has reached a target height TH. The gap G2 exists between the outer peripheral surface 38C of the housing 38 and the inner peripheral surface 42A of the annular portion 42 of the storage portion 36. Therefore, in a case where a user tries to observe the liquid surface in the storage portion 36 from the outside, light travelling from the inside of the storage portion 36 to the outside of the annular portion 42 is refracted by the outer peripheral surface 38C and the inner peripheral surface 42A. Therefore, it is not possible to accurately check whether the liquid surface has reached the target height TH.

The light guide portions 56 are located in the gap between the outer peripheral surface 38C and the inner peripheral surface 42A and is integrally formed with both of the housing 38 and the annular portion 42 of the storage portion 36. Therefore, the outer peripheral surface 38C and the inner peripheral surface 42A are not present in the light guide portions 56. Thus, light L1 that travels from the inside of the storage portion 36 through the light guide portions 56 to the outside of the annular portion 42 is emitted to the outside of the annular portion 42 without being affected by refraction by the outer peripheral surface 38C and the inner peripheral surface 42A. A user can accurately check whether the liquid surface in the storage portion 36 has reached the target height TH by looking at the light guide portions 56 with his/her eye EY.

The height of the light guide portions 56 from the bottom part 38B the storage portion 36 is determined in accordance with the target height TH of the liquid surface of the blood BL to be stored in the storage portion 36.

In FIG. 15, as illustrated in the bottom view of the sample container 12, the light guide portions 56 are partially disposed around the central axis CA of the annular portion 42. To be specific, the light guide portions 56 are disposed at four positions at 90° intervals. The light guide portions 56 may be disposed along the entire circumference around the central axis CA. However, partial disposition of the light guide portions 56 provides the following advantage.

That is, in a case where the light guide portions 56 are provided, the thickness of the vicinity of an upper part of the housing 38 is increased, compared with the case where the light guide portions 56 are not provided (see FIG. 14). As the thickness of a resin increases, the temperature of the inside of the resin decreases more slowly. Therefore, in a case where the thickness of the resin increases, distribution of temperature in the resin becomes uneven, and dimensional irregularity tends to occur. Therefore, if the light guide portions 56 are disposed along the entire circumference around the central axis CA, the thickness increases along the entire circumference, and dimensional irregularity tends to occur along the entire circumference. Such dimensional irregularity affects the welding surfaces of the body member 32 and the lid member 31, and may cause a welding failure. In contrast, by partially disposing the light guide portions 56 around the central axis CA as in the present example, an advantage is obtained in that dimensional irregularity is reduced and a welding failure is not likely to occur.

By disposing the plurality of (in the present example, four) light guide portions 56 at regular intervals, compared with a case where the plurality of light guide portion 56 are unevenly disposed, visibility from many directions can be achieved without increasing the number of the light guide portions 56.

As illustrated in FIG. 16, light that propagates by being totally internally reflected inside the housing 38 may become harmful light L2 and may enter the light guide portions 56. In this case, even in a state in which the liquid surface of the blood BL has not reached the target height TH, it may look by illusion as if the liquid surface has reached the target height TH due to the harmful light L2.

In order to solve such a problem, preferably, as illustrated in FIG. 17, entry of the harmful light L2 into the light guide portions 56 is suppressed by roughening the outer peripheral surface 38C of the housing 38, which serves as a propagation path of the harmful light L2. To be specific, an area of the outer peripheral surface 38C from the bottom part 38B to the light guide portion 56 is roughened.

In a case where the outer peripheral surface 38C is roughened, the harmful light L2 generated in the housing 38 is diffused in the housing 38, so that entry of the harmful light L2 into the light guide portion 56 is suppressed. Thus, only light L1, which is not internally reflected and straightly emitted to the outside from the target height TH, enters the eye EY of a viewer. Therefore, the viewer can accurately check whether the liquid surface has reached the target height TH.

Preferably, the outer peripheral surface 38C is roughened to have a surface roughness Ra in the range of 0.4 to 1.6. According to an experiment, in a case where Ra is outside of this range, a small amount of light that is multiply reflected in the housing 38 is slightly visible, and the contrast may decrease. More preferably, Ra≈0.95. Here, Ra is the arithmetic average roughness defined in JIS standard (JIS B0601 (1994), JIS B0031 (1994)). Schematically, the arithmetic average roughness is calculated as follows: a roughness curve representing the profile of peaks and valleys of the outer peripheral surface 38C is calculated by measuring the peaks and valleys of the outer peripheral surface 38C by using a profilometer, and the average of the sizes of the peaks and valleys of the outer peripheral surface 38C in a section to be measured is calculated on the basis of the calculated roughness curve. The roughness curve is a curve such that a measurement direction is allotted to the X-axis and the size of the peaks and valleys is allotted to the Y-axis. For details, refer to definitions in the aforementioned JIS standard.

Preferably, in addition to the outer peripheral surface 38C of the housing 38, a bottom surface 56A (see FIG. 16) and a side surface 56B (see FIG. 15) of the light guide portion 56 are roughened. By doing so, the amount of harmful light L2 that is internally reflected in the light guide portion 56 and emitted can be reduced. In a case where the light guide portion 56 is disposed along the entire circumference around the central axis CA, preferably, the entire circumference is roughened.

The present invention is not limited to the embodiment or the modifications described above and may have various appropriate structures within the gist of the present invention. For example, the embodiment and the modifications described above can be used in combination as appropriate.

REFERENCE SIGNS LIST

10 pipette tip
11 syringe
12 sample container
12A injection opening
14 body
15 projection
18 nozzle portion
20 distal end portion
20A ejection opening
20C outer peripheral surface
CA central axis

What is claimed is:

1. A pipette tip comprising:
   a tubular body having a distal end portion in which an ejection opening that ejects liquid from an injector is formed; and
   at least one projection that is provided on the distal end portion and that projects from a region around the ejection opening in an ejection direction of the liquid, the projection being partially disposed around an axis of the body,
   wherein the at least one projection is provided on a distal end surface of a rib provided on an outer peripheral surface of the distal end portion around the axis, and
   wherein the projection is provided in such a way that a gap is not formed between an inner peripheral surface of the at least one projection and the outer peripheral surface of the distal end portion around the axis in a width direction perpendicular to an axial direction of the distal end portion.

2. The pipette tip according to claim 1, wherein a plurality of projections are provided, and
   wherein the plurality of projections are disposed at intervals around the axis.

3. The pipette tip according to claim 2, wherein the plurality of projections are disposed at regular intervals.

4. The pipette tip according to claim 3, wherein the at least one projection has a columnar shape extending in a longitudinal direction that is the ejection direction.

5. The pipette tip according to claim 4, wherein the at least one projection has a cylindrical columnar shape.

6. The pipette tip according to claim 2, wherein the at least one projection has a columnar shape extending in a longitudinal direction that is the ejection direction.

7. The pipette tip according to claim 6, wherein the at least one projection has a cylindrical columnar shape.

8. The pipette tip according to claim 7, wherein a distal end of the at least one projection is rounded.

9. The pipette tip according to claim 1, wherein the at least one projection has a columnar shape extending in a longitudinal direction that is the ejection direction.

10. The pipette tip according to claim 9, wherein the at least one projection has a cylindrical columnar shape.

11. The pipette tip according to claim 10, wherein a distal end of the at least one projection is rounded.

12. The pipette tip according to claim 1, wherein an occupancy ratio of the at least one projection to an entire circumference around the axis is in a range of 3% to 10%.

13. The pipette tip according to claim 1, wherein the at least one projection has a tapered shape whose diameter decreases from a proximal end side toward a distal end thereof.

14. The pipette tip according to claim 1, wherein an anticoagulant for suppressing coagulation of the liquid is applied to a flow passage in the body through which the liquid from the injector flows toward the ejection opening.

15. The pipette tip according to claim 1, wherein the distal end portion and the at least one projection are integrally formed.

16. A liquid injection method using a pipette tip according to claim 1, the method comprising:
attaching the pipette tip to the injector;
inserting the distal end portion of the pipette tip into an injection opening of a sample container; and
injecting the liquid into the sample container from the injector.

17. The liquid injection method according to claim 16, wherein the pipette tip satisfies a condition $DL/2 \leq RG$,
where DL is a maximum width of a residual droplet in a radial direction of the ejection opening, the residual droplet being a droplet that protrudes from the ejection opening in the ejection direction and that remains, and RG is a distance from a center of the ejection opening to the projection in the radial direction.

18. The liquid injection method according to claim 16, wherein the pipette tip satisfies a condition $HL \leq HG$,
where HL is a maximum length of a residual droplet in the ejection direction, the residual droplet being a droplet that protrudes from the ejection opening in the ejection direction and that remains, and HG is a length of the projection in the ejection direction.

19. The liquid injection method according to claim 16, wherein the injector is used to inject blood into a sample container for centrifugal separation, the blood having been sampled from a living body.

\* \* \* \* \*